No. 774,051. Patented November 1, 1904.

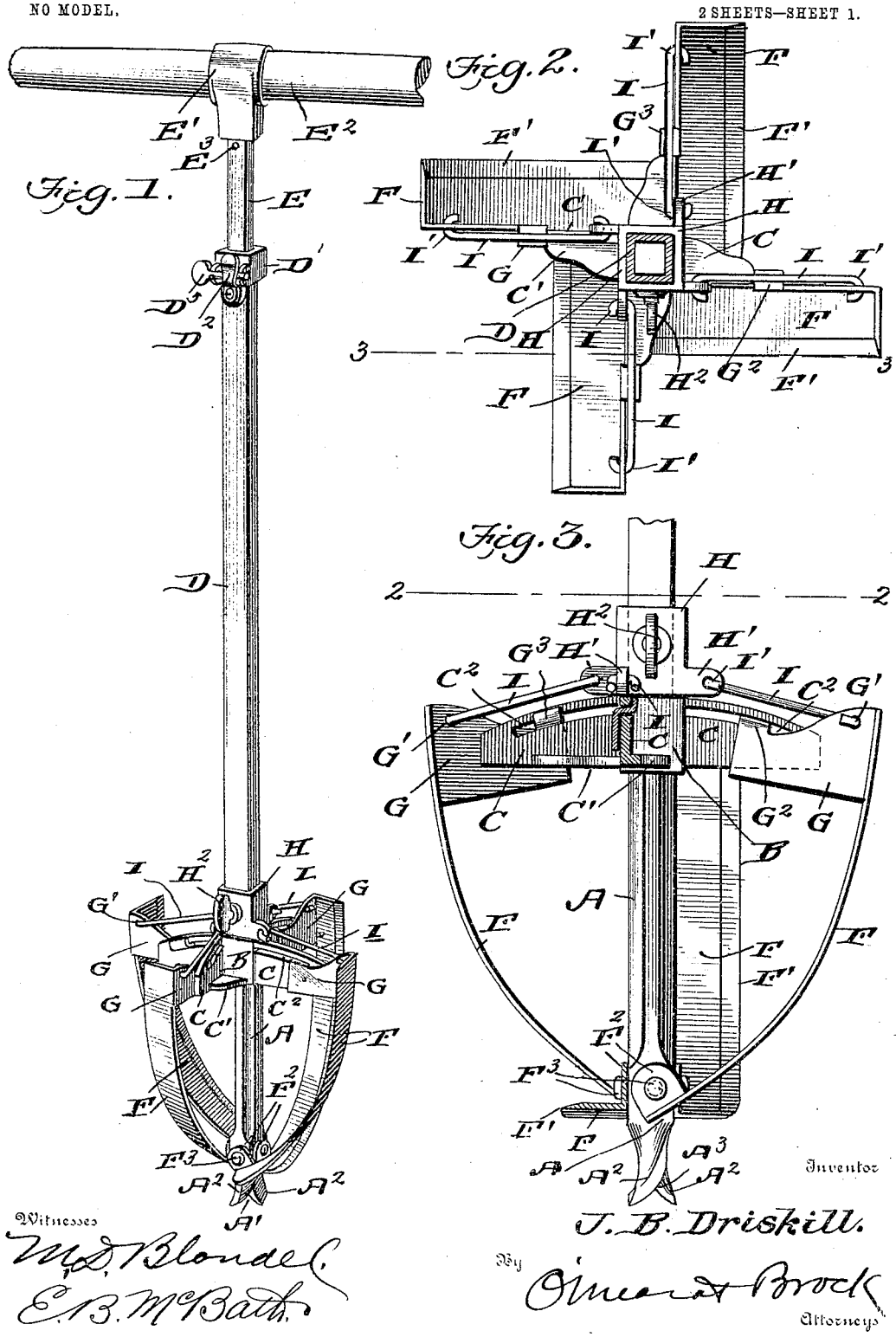

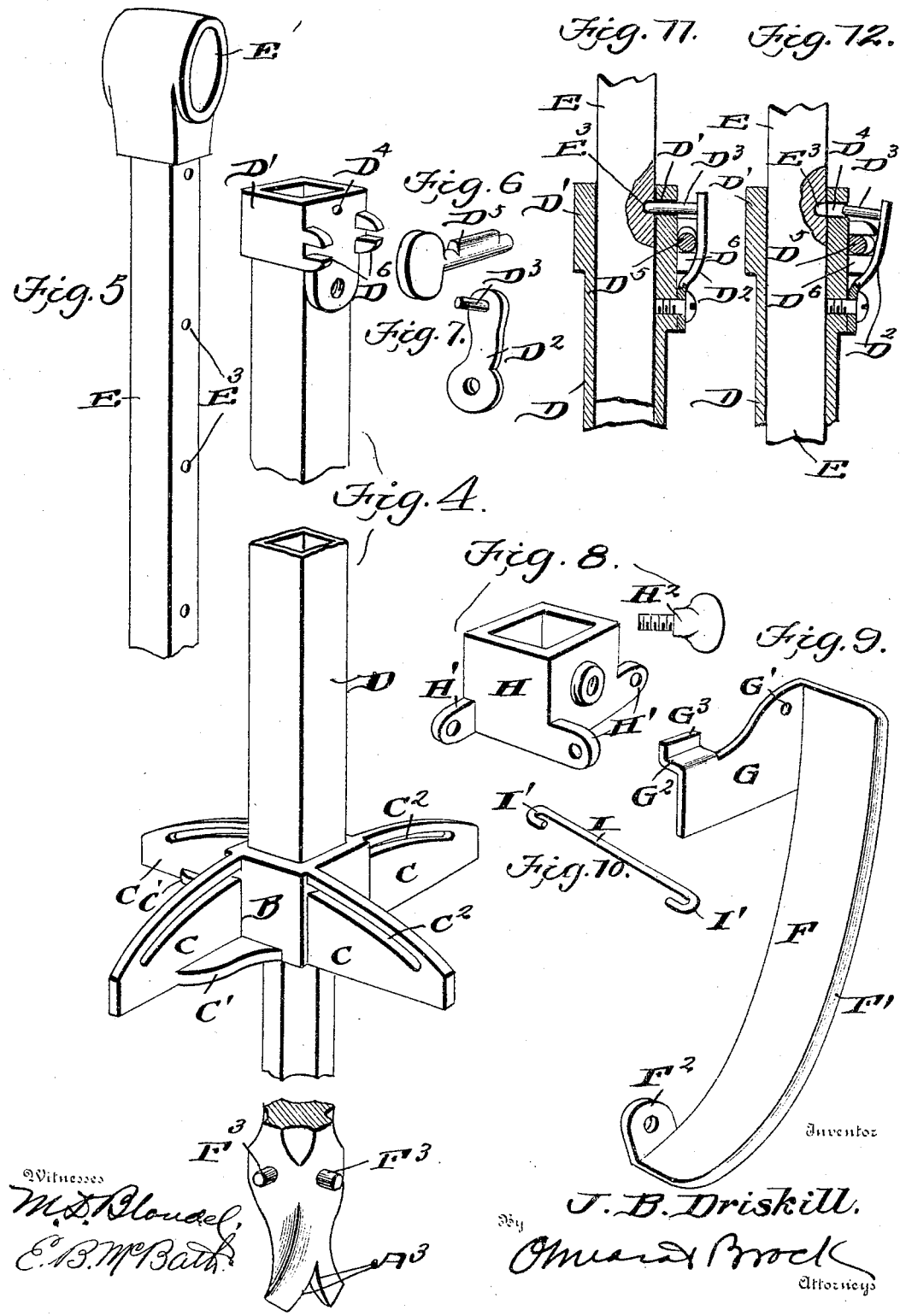

UNITED STATES PATENT OFFICE.

JAMES BYRON DRISKILL, OF PEORIA, ILLINOIS, ASSIGNOR OF ONE-THIRD TO NICHOLAS A. WORTHINGTON, OF PEORIA, ILLINOIS.

POST-HOLE AUGER.

SPECIFICATION forming part of Letters Patent No. 774,051, dated November 1, 1904.

Application filed March 26, 1904. Serial No. 200,180. (No model.)

*To all whom it may concern:*

Be it known that I, JAMES BYRON DRISKILL, a citizen of the United States, residing at Peoria, in the county of Peoria and State of Illinois, have invented a new and useful Improvement in Post-Hole Augers, of which the following is a specification.

This invention is an improved construction of post-hole auger, the object being to provide an exceedingly simple and highly efficient construction of auger and one in which the cutting-blades can be quickly and easily adjusted for the purpose of cutting a large or small hole, as required, and one in which the operating-shaft can be adjusted to the proper length for operating.

Another object of the invention is to provide a boring or cutting device of such construction that the earth will be readily collected and held therein and from which the earth can be quickly and easily dumped after the auger has been withdrawn from the hole.

Another object of the invention is to provide an improved construction of auger-point, whereby the operation of the auger as a whole is greatly facilitated.

With these various objects in view the invention consists in the novel features of construction, combination, and arrangement, all of which will be fully described hereinafter, and pointed out in the claims.

In the drawings forming a part of this specification, Figure 1 is a perspective view of a post-hole auger constructed in accordance with my invention. Fig. 2 is a sectional plan view on the line 2 2 of Fig. 3. Fig. 3 is a detail sectional view on the line 3 3 of Fig. 2. Fig. 4 is a detail perspective view illustrating the tubular shaft, the casting into which said shaft fits, and the guide-arms connected to said casting, together with the shank having the bifurcated bit at the lower end. Fig. 5 is a detail perspective view showing the upper portion of the solid bar or shaft which telescopes in the tubular shaft. Fig. 6 is a detail perspective view of the key for operating the spring-catch for locking the telescopic sections of the operating-shaft. Fig. 7 is a detail perspective view of said catch. Fig. 8 is a detail perspective view of the sliding collar and set-screw for locking the same. Fig. 9 is a detail perspective view of one of the cutting-blades and guide-arm connected thereto. Fig. 10 shows one of the link-rods connecting the collar and cutting-blade. Figs. 11 and 12 are detail sectional views showing the manner of locking and unlocking the telescopic sections of the operating-shaft.

In constructing my improved form of post-hole auger I employ a shank $A$, preferably of steel and bifurcated at its lower end, as shown at $A'$, each member $A^2$ being twisted in reversed directions, each providing a bit-section, the opposing faces of said members being sharpened into cutting-blades, as shown at $A^3$. A bit constructed in this manner has been found highly efficient, inasmuch as it takes a firm hold upon the earth and quickly and easily cuts the initial opening, thereby facilitating the operation of the cutting-blade. This shank $A$ is rigidly connected at its upper end to a casting $B$, carrying a plurality of arms $C$, said arms being arranged at equidistant points, and the number of arms is governed by the number of cutting-blades to be employed, and inasmuch as I prefer to employ four cutting-blades there will of course be four arms connected to the casting. These arms are preferably formed integral with the casting $B$ and a bracing-web $C'$ and serve to greatly strengthen the said parts. A tubular shaft $D$, preferably square in cross-section, has its lower end securely fitted in the casting $B$, and telescoping in this tubular shaft $D$ is a solid shaft or bar $E$, having a horizontal bored head $E'$, in which fits the handle proper, $E^2$, by means of which the auger is turned or operated. The tubular shaft $D$ and the solid shaft $E$ practically constitute the operating-shaft of the device, and the object of making said operating-shaft in sections adjustable one upon the other is to enable the operator to work in the most advantageous position, and by lengthening the operating-shaft as the hole is bored the handle proper can be also maintained at the proper height. The upper end of the tubular shaft D is reinforced by means of a cuff, as shown at D', and connected to said reinforcement is a spring-plate D², carrying a pin D³ at its free end, which passes through the opening D⁴, produced in the tubular shaft adjacent the upper end, said pin being adapted to enter one of the series of holes E³, produced in the adjacent face of the shaft E, thereby locking the solid and tubular shafts against further longitudinal movement. For the purpose of disengaging the pin D³, I employ a key D⁵, which is arranged between the plate D² and the reinforced portion of the tubular shaft and bears against the plate D² for the purpose of disengaging the pin from the opening E³, said key being held in the solid lugs D⁶, formed integral with the cuff D'. It will thus be seen that the operating-shaft can be quickly and easily adjusted to any desired length and locked at said point of adjustment.

F F indicate the cutting-blades, which are preferably made from a good quality of steel and have their outer edges sharpened, as shown at F'. These blades are of a width slightly greater than the tubular shaft; but it will be understood that they may be of any width desired, and their width will probably vary according to the character of the work expected of them. At the lower end the blade is formed with an integral apertured ear F², which is bent at an angle to the blade and is adapted to fit upon the pivot-pin F³, carried at the lower end of the shank A just above the bit. At the upper end of each blade is an arm G, having an aperture G' at a point adjacent the upper outer end of said arm, and it will be noted that this end of the arm is wider than the inner end, said inner end being provided at the upper edges with a laterally-projecting finger G², which plays in the curved slot C² of the adjacent arm C, said laterally-projecting finger G² having an upwardly-extending lip G³, which engages the opposite side of the arm C and serves to hold the arms C and G in their proper positions during the movement of the arm C upon the arms G. The arms C therefore serve as guides for the arms G, carried by the blades, and by means of which the opening and closing movements of said blades are facilitated and steadied.

In order to open and close the cutting-blades F, so as to cut a large or small hole, as desired, I employ a sliding collar H upon the tubular shaft D, said collar being square in cross-section to conform to the shape of the tubular shaft and is provided with apertured lugs H', to which are connected the link-rods I, said link-rods having hooks I' at the opposite ends, one end of each rod being hooked in one of the apertured lugs H' and the opposite end into the aperture G', produced in the end of the adjacent arm G. Thus it will be seen that by sliding the collar H upwardly upon the shaft D the cutting-blades will be drawn inwardly, thereby reducing the size of the auger, and by forcing the collar H downwardly the cutting-blades will be opened and the size of the auger increased or expanded. H² indicates a set-screw by means of which the collar is locked upon the shaft after the cutting-blades have been adjusted.

In operation the cutting-blades are adjusted to the point desired and the sliding collar locked. The length of the operating-shaft is then adjusted and the bit forced into the ground and the auger turned so as to bring the cutting-blades into operation. The earth will be collected and held by the cutting-blades and can be withdrawn from the hole by lifting the auger out, and owing to the construction and arrangement of these blades the earth so removed can be quickly and easily discharged and the auger again turned to the hole for further boring. As the depth of the hole increases the length of the operating-shaft can be increased by simply turning the key so as to disengage the catch and sliding the solid shaft upwardly the desired amount and then relocking the catch.

It will thus be seen that I provide an exceedingly-cheap and highly-efficient construction of post-hole auger by means of which a neat hole can be quickly and easily bored or dug.

Having thus fully described my invention, what I claim as new, and desire to secure by Letters Patent, is—

1. In a post-hole auger a shank having a bifurcated end, each member being twisted in reverse direction relative to the other member to provide a bit.

2. In a post-hole auger a shank bifurcated at the lower end, each member being twisted to provide a bit, and the cutting-blades connected to the shank above the bit, said blades curving longitudinally, outwardly, and upwardly from said bit, together with means for rotating the bit and blades.

3. In a post-hole auger, a shank having a bit, a casting carried by the shank, longitudinally-slotted guide-arms extending outwardly from the casting, cutting-blades attached at their lower ends to the shaft adjacent the bit, arms carried by said blades having fingers adapted to engage the slots of the guide-arms, and means for rotating the shank.

4. A post-hole auger comprising a shank having a bifurcated bit at the lower end and a casting at the upper end having slotted guide-arms, cutting-blades connected to the shank above the bit and having arms at their upper ends, the inner ends of said arms being provided with angular fingers adapted to engage the slotted guide-arms, an operating-shaft comprising the tubular lower section and the solid upper section, a spring-catch for locking the said sections and means for releasing said catch, a sliding collar arranged upon the operating-shaft, and rods connecting said sliding collar and the cutting-blades, all arranged and adapted to operate as set forth.

JAMES BYRON DRISKILL.

Witnesses:
ALBERT EICHENBERGER,
JOSEPH BELSLEY.